March 25, 1969
J. G. SOLA
3,435,330
INDUCTIVE VOLTAGE DIVIDER-AUTOTRANSFORMER AUTOMATIC
VOLTAGE REGULATING SYSTEM
Filed Dec. 8, 1965
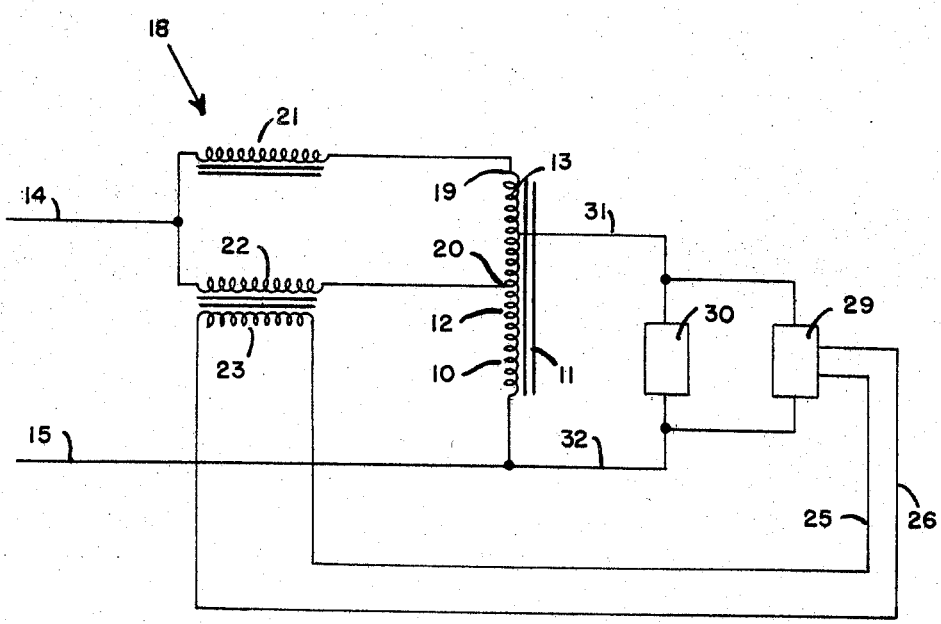
INVENTOR.
JOSEPH G. SOLA
BY
ATTORNEYS United States Patent Office 3,435,330
Patented Mar. 25, 1969

3,435,330
INDUCTIVE VOLTAGE DIVIDER-AUTO-
TRANSFORMER AUTOMATIC VOLTAGE
REGULATING SYSTEM
Joseph G. Sola, River Forest, Ill., assignor to
Sola Basic Industries, Inc., a corporation of
Wisconsin
Filed Dec. 8, 1965, Ser. No. 513,902
Int. Cl. H02p 13/06; H02m 5/12
U.S. Cl. 323—43.5         2 Claims

ABSTRACT OF THE DISCLOSURE

An automatic voltage regulating system wherein the load voltage across a portion of an autotransformer winding is sensed and utilized to provide a direct current control signal to the control winding of a saturable reactor in parallel with a linear reactor connected to a portion of the autotransformer winding on the input side.

This invention relates to power modulators and especially to a system and modulator or regulator for use as a line voltage or constant voltage regulator.

Available supply voltage may vary considerably depending upon numerous factors. Line voltage fluctuation due to a regulation within the feeder is a function of the impedance of the line and the stepdown transformers. Voltage fluctuations of significant magnitude may be caused by intermittent loads such as welders, ovens and other equipment. Various types of automatic voltage regulating equipment have been used in the past, some of which are relatively inexpensive and slow in response.

The principal object of the invention is to provide a power modulator which will provide the desired waveform and at the same time be fast.

Another object of the invention is to provide a system or device which can use various control devices of relatively small size and weight, and ones of which will give fast response.

In one aspect of the invention, the core has a winding thereon which can be a single winding in an autotransformer configuration wherein the winding is unidirectional or may be a pair of windings in transformer relationship. The single or main winding may have an extension thereof mounted on the core and in serial unidirectional relationship. An inductive potential divider is used which has at least a pair of impedances, preferably two, which are connected together and have terminals connected at spaced points along said winding or winding and extension, or to the primary winding. One of the input leads can be connected to the connection between said pair of impedances and the other input lead to the other end of the main winding or adjacent thereto. The leads to the load can be connected to said main winding at the ends thereof or points adjacent said ends.

The impedances are saturable reactors, at least one of which is variable or nonlinear. The variable saturable reactor may be controlled by a D.C. control winding which is connected to a suitable load sensing arrangement.

The sole figure of the drawing is a circuit diagram showing one form of the invention, some portions being in block representation.

Referring to the drawing, winding 10 is wound on core 11 in a conventional manner. In the form shown, it has a main winding portion 12 and an extension 13. The inductive potential divider shown generally at 18 is connected at spaced points 19, 20 to winding 10. The illustrated potential divider consists of a pair of saturable reactors 21, 22. Reactor 21 is a linear reactor. Variable saturable reactor 22 has a control winding 23 which receives D.C. control energy from the controller 29 through leads 25, 26. Controller 29 senses output voltage and may be of any suitable type, such as a solid-state sensor (not shown). Load 30 is connected by leads 31 and 32 to the winding means 10.

When the output voltage drops below a preset value, the feedback or control signal turns the controller to the condition that will return the output voltage to a predetermined value.

It should be apparent that details of the invention can be varied without departing from the spirit of the invention except as defined in the appended claims.

What is claimed is:
1. In a power modulator for supplying energy to a load means, the combination including core means, unidirectional winding means on said core means, an inductive potential divider comprising at least a pair of impedances, at least one of which is variable and another linear, connecting means for connecting together one of the ends of said impedances, means connecting the other of the ends of said impedances at spaced points along said unidirectional winding means, means connecting A.C. to one end of said unidirectional winding means and to said connecting means across said impedances, means connecting said load means to said one end of said unidirectional winding means and to a point adjacent the other end thereof, and means for varying the impedance of the impedance which is variable.

2. In a power modulator for supplying energy to a load means, the combination including core means, unidirectional winding means on said core means, an inductive potential divider comprising at least a pair of impedances, at least one of which is variable and another linear, connecting means for connecting together one of the ends of said impedances, means connecting the other of the ends of said impedances at spaced points along said unidirectional winding means, means connecting A.C. to one end of said unidirectional winding means and to said connecting means across said impedances, means connecting said load means to said one end of said unidirectional winding means and to a point spaced from the other end thereof, and voltage responsive means for varying the impedance of the impedance which is variable.

References Cited

UNITED STATES PATENTS

| 2,530,011 | 11/1950 | Forssell | 323—61 X |
| 2,547,615 | 4/1951 | Bedford | 323—43.5 |
| 2,714,188 | 7/1955 | Scherer | 323—66 |
| 3,263,157 | 7/1966 | Klein | 323—22 |
| 3,268,798 | 8/1966 | Burski | 323—66 |
| 3,353,093 | 11/1967 | Peterson | 323—43.5 |

WARREN E. RAY, *Primary Examiner.*

U.S. Cl. X.R.
323—47, 61, 82, 89